United States Patent
Brunssen et al.

(10) Patent No.: US 6,928,429 B2
(45) Date of Patent: Aug. 9, 2005

(54) SIMPLIFYING BROWSER SEARCH REQUESTS

(75) Inventors: Vincent Carl Brunssen, Round Rock, TX (US); David Paul Kuiken, Round Rock, TX (US); Song Thanh Trinh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 09/821,067

(22) Filed: Mar. 29, 2001

(65) Prior Publication Data

US 2002/0143750 A1 Oct. 3, 2002

(51) Int. Cl.[7] .................. G06F 17/30; G06F 7/00; G06F 15/16
(52) U.S. Cl. ................ 707/3; 707/4; 709/203
(58) Field of Search ............... 707/3, 4; 709/203

(56) References Cited

U.S. PATENT DOCUMENTS

| | | | | |
|---|---|---|---|---|
| 5,659,729 A | * | 8/1997 | Nielsen ........................ | 707/3 |
| 6,012,053 A | * | 1/2000 | Pant et al. .................... | 707/3 |
| 6,148,289 A | * | 11/2000 | Virdy ........................... | 705/1 |
| 6,278,993 B1 | * | 8/2001 | Kumar et al. ................. | 707/3 |
| 6,338,082 B1 | * | 1/2002 | Schneider .................... | 709/203 |
| 6,356,905 B1 | * | 3/2002 | Gershman et al. ............ | 707/10 |
| 6,360,215 B1 | * | 3/2002 | Judd et al. ..................... | 707/3 |
| 6,513,031 B1 | * | 1/2003 | Fries et al. .................... | 707/3 |
| 6,594,697 B1 | * | 7/2003 | Praitis et al. ................ | 709/225 |
| 6,643,641 B1 | * | 11/2003 | Snyder .......................... | 707/4 |

OTHER PUBLICATIONS

HTML 3.2 plus, The definitive HTML 3.2 problem–solver. David Kerven et al., Published by Waite Group Press, 1997.* http://www. Aspgrid.com/faq.html by Persits Software, Inc. Copyright 2000.*

* cited by examiner

*Primary Examiner*—Frantz Coby
*Assistant Examiner*—Cindy Nguyen
(74) *Attorney, Agent, or Firm*—Duke W. Yee; Marilyn Smith Dawkins; Stephen R. Tkacs

(57) ABSTRACT

A method, apparatus, and computer instructions for searching for information. In response to receiving an input string, the input string is parsed for a universal resource identifier and a search string, wherein the universal resource identifier and the search string are separated from each other in the input string by a selected character. The information corresponding to the search string is searched through a Web page identified by the universal resource identifier. The information may be searched by at least one of (a) locating a search object on the Web page, and using the search object to search for the information; and (b) searching the Web page for information corresponding to the search string.

25 Claims, 6 Drawing Sheets

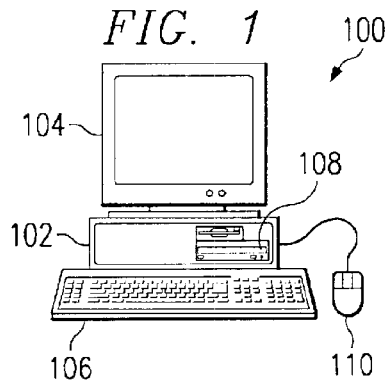
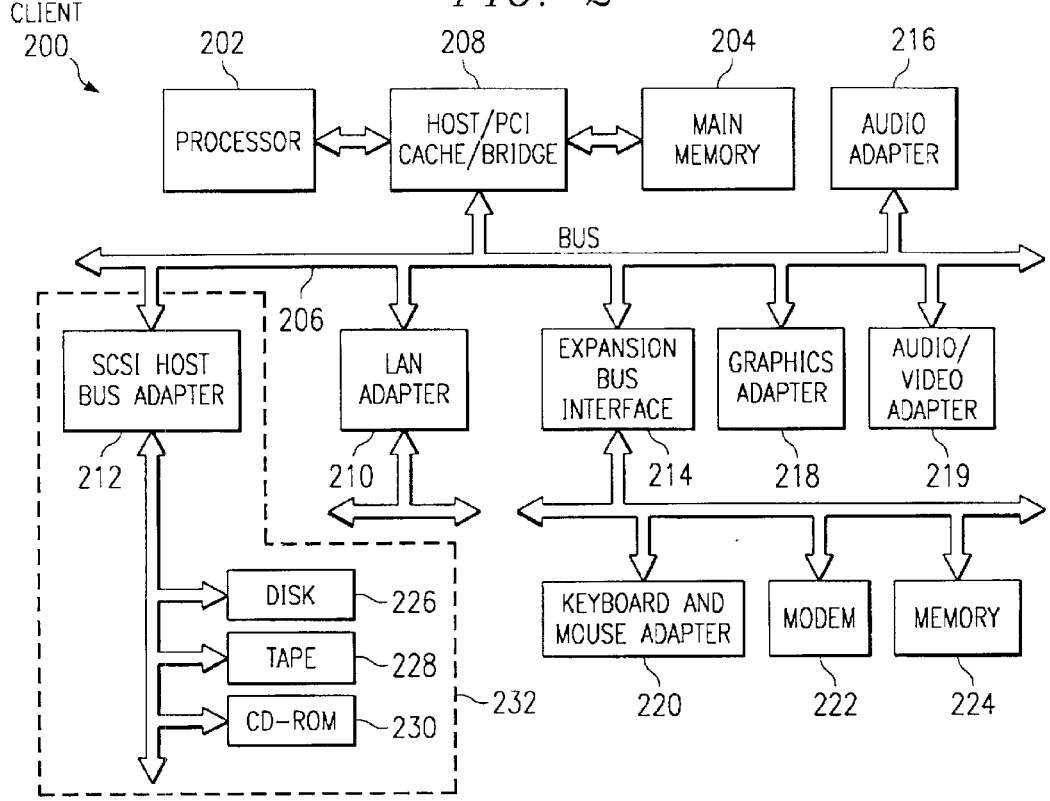

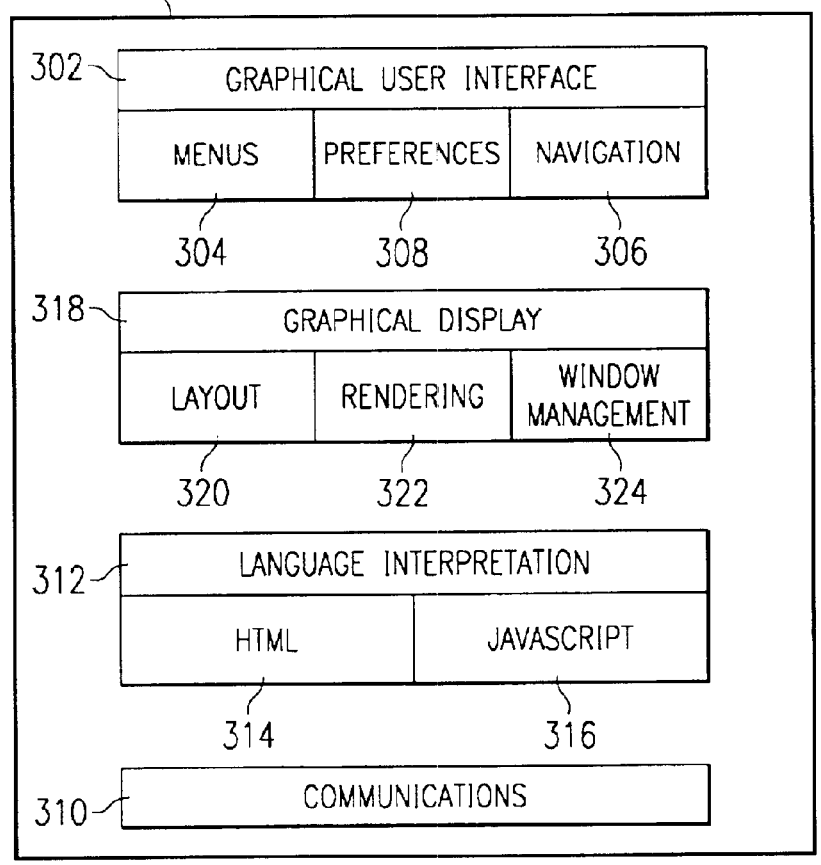
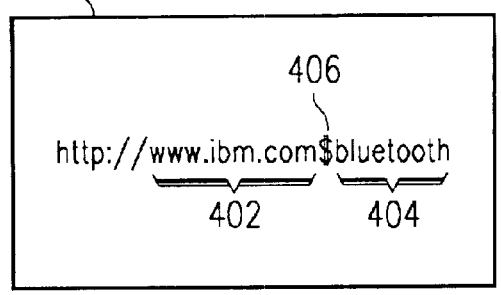

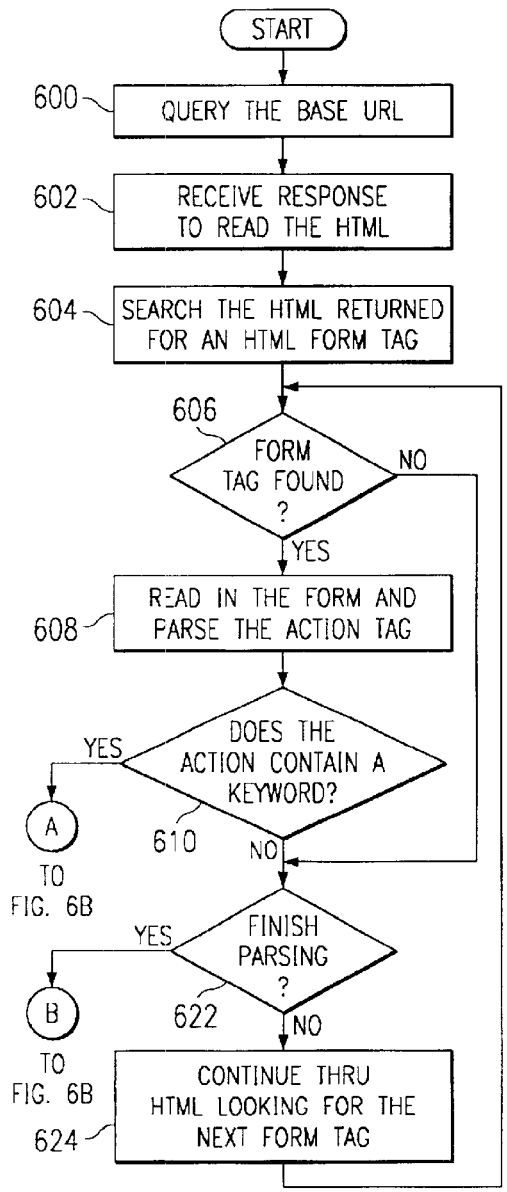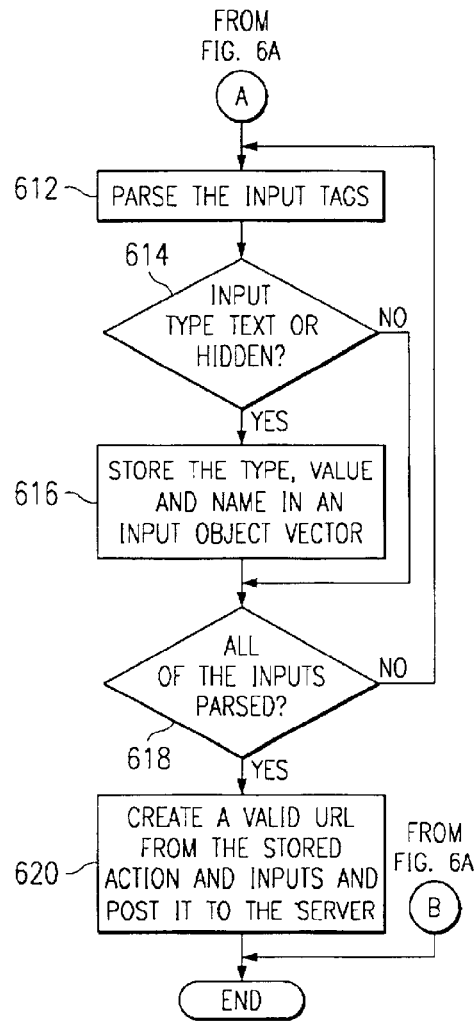

FIG. 7A

```
private String findSearchEngine(String sURL)
{
  String sSE = null;
  try
  {
    System.out.println("findSearchEngine: enter");

// create a URL object from the http://xxx string
    URL tempURL = new URL(sURL);
    int index = 0;

// Get a stream to read in the HTML from the page.
    BufferedReader br = new BufferedReader(newInputStreamReader(tempURL.openStream()));

String line = br.readLine();
    while (line != null)
    {
      // Convert to lower case for case insensitive search
      line = line.toLowerCase();
      //System.out.println("findSearchEngine: Read in a line");
      //System.out.println("Line = " + line);

//Need to make the assumption that the search engine action will
      //be inside of a form
      //So read in the entire form contents
      StringBuffer sbForm = new StringBuffer();
      if (line.indexOf("<form")> = 0)
      {
        System.out.println("findSearchEngine: found a form tag");
        while (line.indexOf("/form>") == -1)
        {
          sbForm.append(line);
          line = br.readLine().toLowerCase();
        } // end while // now that we have the entire form lets parse it for the action and
        // the inputs
        String sForm = sbForm.toString();
        System.out.println("findSearchEngine: Got a form the from is as follows:");
        System.out.println(sForm);
```

```
// Now parse the action of the form
  setAction(doParseAction(sForm));
  if (getAction().indexOf("search") != -1)
  {
    // we have a candidate for the search so lets parse the inputs
    doParseInput(sForm);

// now we have all that we need so lets create the search engine string
    Vector vecInputs = getInputs();
    if (vecInputs != null && vecInputs.size() > 0)
    {
      sSE = getAction().toString() + "?";
      if (!sSE.startsWith("http:"))
      {
        sSE = sURL+sSE;
      } // end if
      HTMLInput htmlInput = null;
      Enumeration enum = vecInputs.elements();
      while (enum.hasMoreElements())
      {
        htmlInput = (HTMLInput)enum.nextElement();
        System.out.println("Input = " + htmlInput.toString());
        if (htmlInput.getType().equalsIgnoreCase("text"))
        {
          // this is probably the search word so add it in special
          sSE = sSE + htmlInput.getName() + "=" + getSearchKey() + "&";
        } // end if
        else
        {
          sSE = sSE + htmlInput.toString() + "&";
        } // end else
      } // end while
      // when we are all done remove the trailing &
      sSE = sSE.substring(0, sSE.length() - 1);
    } // end if
    // break out of the while loop because we have found the search engine.
    break;
  } // end if
} // end if line = br.readLine();
} // end while
}
catch (Exception e)
{
  e.printStackTrace();
} // end catch System.out.println("findSearchEngine: exit");
return sSE;
} // end findSearchEngine
```

FIG. 7B

SIMPLIFYING BROWSER SEARCH REQUESTS

BACKGROUND OF THE INVENTION

1. Technical Field

The present invention relates generally to an improved data processing system and, in particular, to a method, system, and computer program for searching for data. Still more particularly, the present invention relates to a method, system, and computer program for simplifying search requests.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Currently, when a user searches for text or information on a Web site, the user must enter the site itself. After entering the site, a "search" option is selected. A search query is entered into the fields provided and the search is activated or initiated by selecting or pressing a search button. Such a search process requires a number of steps and time. For example, entering a Web site often is not immediate and takes some amount of time, depending on the graphics and other features provided, a significant amount of time may pass before the Web site is entered, especially if the user is accessing the Internet through a dialup connection. After entering the site, the user must find the page or enter search queries when a search option is found for the site. These additional steps also take time. Most users on the Web are impatient and do not like to wait for content to be downloaded for presentation. The amount of time and steps frustrate users exploring the Web. Additionally, even if the user is accessing Web sites through a broad band connection, such as a cable or digital subscriber line (DSL) connection, traffic at the Web site or on nodes between the user and the Web site also may cause delays.

Therefore, it would be advantageous to have an improved method, apparatus, and computer instructions for searching a Web site.

SUMMARY OF THE INVENTION

The present invention provides a method, apparatus, and computer program for searching for information. In response to receiving an input string, the input string is parsed for a universal resource identifier and a search string, wherein the universal resource locator and the search string are separated from each other in the input string by a selected character. The information corresponding to the search string is searched through a Web page identified by the universal resource identifier. The information may be searched by at least one of (a) locating a search object on the Web page, and using the search object to search for the information; and (b) searching the Web page for information corresponding to the search string

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented in accordance with a preferred embodiment of the present invention;

FIG. 2 is a block diagram of a data processing system shown in which the present invention may be implemented;

FIG. 3 is a block diagram of a browser program in accordance with a preferred embodiment of the present invention;

FIG. 4 is a diagram illustrating an address field in a browser in accordance with a preferred embodiment of the present invention.

FIGS. 6A and 6B are flowcharts of a process for determining whether a search object is present in accordance with a preferred embodiment of the present invention; and FIGS. 7A and 7B are diagrams illustrating one method of code used for finding a search object in an HTML document in accordance with a preferred embodiment of the present invention.

DETAILED DESCRIPTION OF THE PREFERRED EMBODIMENT

Figure 5:
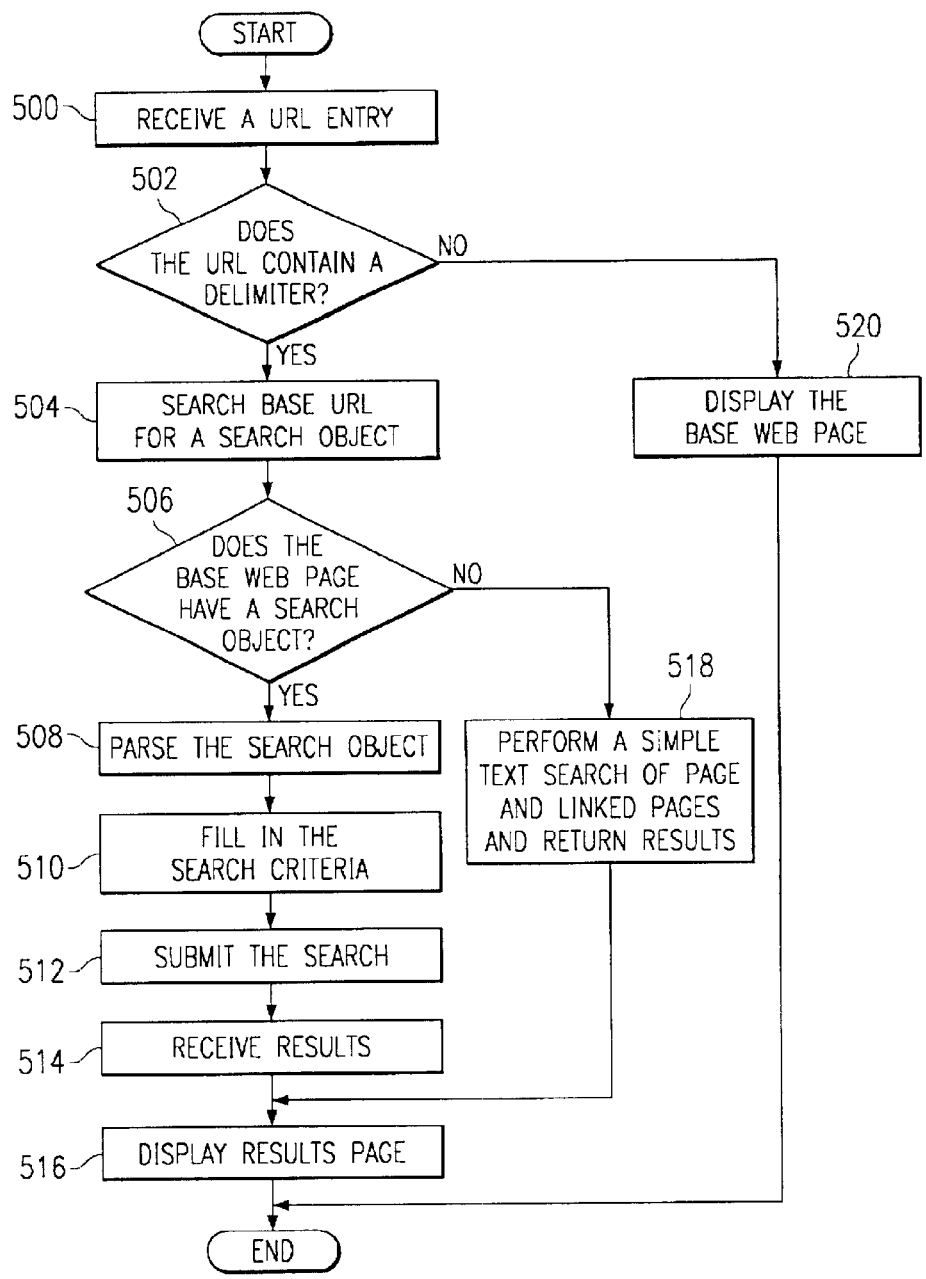
FIG. 5 is a flowchart of a process used for implementing a simplified search mechanism in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Turning next to FIG. 3, a block diagram of a browser program is depicted in accordance with a preferred embodiment of the present invention. A browser is an application used to navigate or view information or data in a distributed database, such as the Internet or the World Wide Web.

In this example, browser 300 includes a user interface 302, which is a graphical user interface (GUI) that allows the user to interface or communicate with browser 300. This interface provides for selection of various functions through menus 304 and allows for navigation through navigation 306. For example, menu 304 may allow a user to perform various functions, such as saving a file, opening a new window, displaying a history, and entering a URL. Navigation 306 allows for a user to navigate various pages and to select Web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communication 310 uses HTTP. Other protocols may be used depending on the implementation. Documents that are received by browser 300 are processed by language interpretation 312, which includes an HTML unit 314 and a JavaScript unit 316. Language interpretation 312 will process a document for presentation on graphical display 318. In particular, HTML statements are processed by HTML unit 314 for presentation while JavaScript statements are processed by JavaScript unit 316.

Graphical display 318 includes layout unit 320, rendering unit 322, and window management 324. These units are involved in presenting Web pages to a user based on results from language interpretation 312.

Browser 300 is presented as an example of a browser program in which the present invention may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 may be implemented using known browser applications, such as Netscape Navigator or Microsoft Internet Explorer. Netscape Navigator is available from Netscape Communications Corporation while Microsoft Internet Explorer is available from Microsoft Corporation.

The present invention provides a method, apparatus, and computer instructions for simplifying the process for searching a Web site for information. The mechanism of the present invention allows the user to search the desired text by entering search text within the URL entry field in a browser.

Turning next to FIG. 4, a diagram illustrating an address field in a browser is depicted in accordance with a preferred embodiment of the present invention. Address field 400 in this example includes URL 402 and search string 404 separated by delimiter 406. In this example, the delimiter is a "$", but any delimiter may be used depending on the implementation. The mechanism of the present invention parses the entry and address field 400 and uses URL 402 as the starting Web site page and search string 404 as the string to be used as search text for searching for information at the Web site.

The mechanism of the present invention searches for a search object that may be located in the starting Web page. This search object may be executed by the mechanism of the present invention through various methods, such as a script file, application, or browser application. The mechanism searches the Web page for a tag FORM containing an action with a key word, such as, for example, search or find. If the action tag is one that contains a possible search object, the mechanism finishes parsing the form and collects input tag parameters of name, type, and value in an input object. Using this information, a URL with an action tag value is formulated. Values placing the search text in the appropriate input field are entered by the mechanism and submitted with the form. The search results from using an object on the Web site or searching the pages directly are processed and may be presented to the user.

If a search object is absent the mechanism of the present invention may search the Web site directly. For example, at the starting Web site page, the mechanism of the present invention may search the page and any URL's contained in that page to identify the search text entered within address field 400. When pages and links on pages are searched, any number of levels may be searched depending on the particular implementation.

Turning now to FIG. 5, a flowchart of a process used for implementing a simplified search mechanism is depicted in accordance with a preferred embodiment of the present invention. The process illustrated in FIG. 5 may be implemented using computer instructions in browser 300 in FIG. 3.

The process begins by receiving a URL entry, (step 500). A determination is then made as to whether this entry contains a delimiter (step 502). If the URL entry contains a delimiter, then the base URL is searched for a search object (step 504). A determination is then made as to whether this base Web page identified by the URL contains a search object (step 506). If a search object is present, then the search object is parsed to identify search criteria (step 508). The identified search criteria is filled in (step 510). Thereafter, the search is submitted (step 512). Search results are received (step 514), and the results are presented to the user (step 516) with the process terminating thereafter.

With reference again to step 506, if the base Web page does not have a search object, then a simple search of the page and linked pages are performed (step 518) with the process then proceeding to step 516 as described above.

With reference again to step 502, if the URL does not contain a delimiter, then the base Web page identified by the URL is presented to the user step 520 with the process terminating thereafter.

Turning next to FIGS. 6A and 6B, flowcharts of a process for determining whether a search object is present is depicted in accordance with a preferred embodiment of the present invention. The process illustrated in FIGS. 6A and 6B may be implemented as computer instructions and is a more detailed description of step 504 in FIG. 5. The process begins querying the base URL (step 600). A response containing an HTML document is received (step 602). The HTML document is searched for an HTML FORM tag (step 604). A determination is made as to whether a FORM tag is present in the HTML document (step 606). If a FORM tag is present, then the information identified by the FORM tag is read and parsed to identify an HTML ACTION tag (step 608). A determination is made as to whether the ACTION tag contains a key word (step 610). In these examples, the key word may be, for example, search or find. If a key word is found, the contents of the FORM tag are a candidate for a search object. Then, the input tags are parsed (step 612). The determination is made as to whether the INPUT is of type TEXT or HIDDEN (step 614). If the INPUT is of the type TEXT or HIDDEN then the TYPE, VALUE, and NAME are stored in an INPUT object vector (step 616).

INPUT is an HTML tag for flagging input parameters inside a "FORM" tag. INPUT tags can have types, two of which are "HIDDEN" and "TEXT". A "TEXT" and a "HIDDEN" type of INPUT have many attributes, but "NAME" and "VALUE" are two attributes captured because they are the ones which are passed as parameters to the search object.

A determination is then made as to whether all of the INPUTS have been parsed (step 618). If all of the INPUTS have been parsed, then a valid URL is created from the stored ACTION and the INPUTS and this information is posted or sent to the server (step 620) with the process terminating thereafter.

With reference again to step 618, if all of the INPUTS have not been parsed, the process then returns to step 612 as described above.

With reference again to step 614, if the INPUT is not of a type TEXT or HIDDEN, the process then proceeds to step 618 as described above.

With reference again to step 610, if the ACTION identified by the ACTION tag does not contain a key word, then a determination is made as to whether all of the HTML document has been parsed (step 622). If all of the HTML document has not been parsed, the process then continues to parse the HTML document for the next FORM tag (step 624) with the process then proceeding to step 606 as described above. On the other hand, if the entire HTML document has been parsed, the process terminates. With referenced back to step 606, if a FORM tag is not found then the process proceeds to step 622 as described above.

Turning next to FIGS. 7A and 7B, diagrams illustrating one method of code used for finding a search object in an HTML document are depicted in accordance with a preferred embodiment of the present invention.

Thus, the present invention provides an improved method, apparatus, and computer instructions for simplifying the process used to search for information on a Web site. The mechanism provides this advantage through avoiding having to download all the contents used to present a Web page to a user. Only the base HTML document is downloaded. Objects identified or pointed to by the document for presentation are not downloaded in these examples.

Although the depicted examples illustrate the implementation of the processes of the present invention in a browser, the processes may be implemented in other forms. For example, the processes may be implemented using a script file or within an application, such as a word processor. Also, the examples are described with respect to HTML, but the processes of the present invention may be applied to other markup languages.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for searching for information, the method comprising:

responsive to receiving an input string, parsing the input string for a universal resource identifier and a search string, wherein the universal resource identifier and the search string are separated from each other in the input string by a selected delimiter;

identifying a Web page identified by the universal resource identifier;

determining whether the Web page has a search object; and searching for the information corresponding to the search string through the Web page identified by the universal resource identifier, wherein if the Web page has a search object the searching step comprises;

locating a search object on the Web page; and using the search object to search for the information and wherein if the Web page does not have search object the searching step comprises:

performing a simple text search of the Web page.

2. The method of claim 1, wherein the searching step comprises:

searching the Web page for information corresponding to the search string.

3. The method of claim 2, wherein the searching step further comprises:

searching Web pages identified by any universal resource identifiers found on the Web page.

4. The method of claim 1, wherein the universal resource identifier is a universal resource locator.

5. The method of claim 1, wherein the method is implemented in a Web browser on the data processing system.

6. The method of claim 1, wherein the method is implemented in a program located on the data processing system.

7. The method of claim 1, further comprising:

presenting results of the search.

8. The method of claim 7, wherein the results are presented as a set of universal resource identifiers, wherein each universal resource identifier within the set of universal identifiers locators are selectable to retrieve an associated Web page.

9. The method of claim 1, wherein the selected delimiter is at least one of a "$", "%", "*", and "#".

10. A method in a data processing system for searching for information, the method comprising:

responsive to receiving an input string, parsing the input string for a universal resource identifier and a search string, wherein the universal resource identifier and the search string are separated from each other in the input string by a selected delimiter;

searching a Web page identified by the universal resource identifier for a search object;

if the Web page has a search object, initiating a search for the information through the search object, wherein the search is based on the search string; and if the Web page does not have a search object, initiating a simple text search for the information based on the search string.

11. A data processing system for searching for information, the data processing system comprising:

parsing means, responsive to receiving an input string, for parsing the input string for a universal resource identifier and a search string, wherein the universal resource identifier and the search string are separated from each other in the input string by a selected character;

identification means for identifying a Web page identified by the universal resource identifier;

determination means for determining whether the Web page has a search object; and searching means for searching for the information corresponding to the search string through Web page identified by the universal resource identifier, wherein the searching means comprises:
  means for locating a search object on the Web page and using the search object to search for the information if the Web page has a search object; and
  means for performing a simple text search of the Web page if the Web page does not have a search object.

12. The data processing system of claim 11, wherein the searching means comprises:
  means for searching the Web page of information corresponding to the search string.

13. The data processing system of claim 12, wherein the searching means further includes:
  means for searching Web pages identified by any universal resource identifiers found on the Web page.

14. The data processing system of claim 11, wherein the universal resource identifier is a universal resource locator.

15. The data processing system of claim 11, wherein the parsing means and the searching means are implemented in a Web browser on the data processing system.

16. The data processing system of claim 11, wherein the parsing means and the searching means are implemented in a program located on the data processing system.

17. The data processing system of claim 11 further comprising:
  presenting means for presenting results of the search.

18. The data processing system of claim 17, wherein the results are presented as a set of universal resource identifiers, wherein each universal resource identifier within the set of universal resource identifiers are selectable to retrieve an associated Web page.

19. The data system of claim 11, wherein the selected delimiter is at least one of a "$", "%", "*", and "#".

20. A data processing system for searching for information, the data processing system comprising:
  parsing means, responsive to receiving an input string, for parsing the input string for a universal resource identifier and a search string, wherein the universal resource identifier and the search string are separated from each other in the input string by a selected delimiter,
  searching means for searching a Web page identified by the universal resource identifier for a search object;
  initiating means for initiating a search for the information through the search object if the Web page has a search object, wherein the search is based on the search string; and
  means for initiating a simple text search for the information based on the search string if the Web page does not have a search object.

21. A data processing system comprising:
  a bus system;
  a communications unit connected to the bus system;
  a memory connected to the bus system, wherein the memory includes as set of instructions; and
  a processing unit connected to the bus system, wherein the processing unit executes the set of instructions to parse the input string for a universal resource identifier and a search string, wherein the universal resource identifier and the search string are separated from each other in the input string by a selected delimiter, responsive to receiving an input string; identify a Web page identified by the universal resource identifier, determine whether the Web page has a search object; search the Web page identified by the universal resource identifier for a search object; and initiate a search for the information through the search object, wherein the search is based on the search string.

wherein if the Web page has a search object the search step comprises:
  locating a search object on the Web page; and
  using the search object to search for the information; and wherein if the Web page does not does not have a search object the search step comprises:
  performing a simple text search of the Web page.

22. A computer program product in a computer readable medium for searching for information, the computer program product comprising:
  first instructions, responsive to receiving an input string, for parsing the input string for a universal resource identifier and a search string, wherein the universal resource identifier and the search string are separated from each other in the input string by a selected delimiter;
  second instructions for searching a Web page identified by the universal resource identifier for a search object;
  third instructions for initiating a search for the information through the search object if the Web page has a search object, wherein the search is based on the search string; and
  fourth instructions for initiating a simple text search for the information based on the search string if the Web page does not have a search object.

23. A method in a data processing system for searching for information, the method comprising:
  responsive to receiving an input string, parsing the input string for a universal resource identifier and a search string, wherein the universal resource identifier and the search string are separated from each other in the input string by a selected delimiter; and
  searching for the information corresponding to the search string through a Web page identified by the universal resource identifier by at least one of (a) locating a search object on the Web page, and using the search object to search for the information; and (b) searching the Web page for information corresponding to the search string.

24. A data processing system for searching for information, the data processing system comprising:
  parsing means, responsive to receiving an input string, for parsing the input string for a universal resource identifier and a search string, wherein the universal resource identifier and the search string are separated from each other in the input string by a selected delimiter; and
  searching means for searching for the information corresponding to the search string through a Web page identified by the universal resource identifier by at least one of (a) locating a search object on the Web page, and using the search object to search for the information; and (b) searching the Web page for information corresponding to the search string.

25. A computer program product in a computer readable medium searching for information, the computer program product comprising:
  first instructions, responsive to receiving an input string, for parsing the input string for a universal resource identifier and a search string, wherein the universal resource identifier and the search string are separated from each other in the input string by a selected delimiter; and second instructions for searching for the information corresponding to the search string through a Web page identified by the universal resource identifier by at least one of (a) locating a search object on the Web page, and using the search object to search for the information; and (b) searching the Web page for information corresponding to the search string.

* * * * *

UNITED STATES PATENT AND TRADEMARK OFFICE
CERTIFICATE OF CORRECTION

| | | |
|---|---|---|
| PATENT NO. | : 6,928,429 B2 | Page 1 of 1 |
| APPLICATION NO. | : 09/821067 | |
| DATED | : August 9, 2005 | |
| INVENTOR(S) | : Brunssen et al. | |

It is certified that error appears in the above-identified patent and that said Letters Patent is hereby corrected as shown below:

Col. 9, line 4: before "Web" insert --the--.

Signed and Sealed this

Fifth Day of December, 2006

JON W. DUDAS
*Director of the United States Patent and Trademark Office*